United States Patent
Sugiyama et al.

[19]

[11] Patent Number: 6,099,006
[45] Date of Patent: Aug. 8, 2000

[54] TORSION-BAR TYPE SUSPENSION

[75] Inventors: Takumi Sugiyama, Toyota; Nobuyuki Ogami, Anjo; Tatsuzo Komiya, Okazaki, all of Japan

[73] Assignee: Toyota Jidosha Kabushiki Kaisha, Toyota, Japan

[21] Appl. No.: 09/081,768

[22] Filed: May 21, 1998

[30] Foreign Application Priority Data

Jun. 5, 1997 [JP] Japan ..................................... 9-147637

[51] Int. Cl.[7] ............................ B60G 15/00; B60G 15/07
[52] U.S. Cl. ........................... 280/124.149; 280/124.152; 280/124.167
[58] Field of Search ..................... 280/124.149, 124.152, 280/124.167

[56] References Cited

U.S. PATENT DOCUMENTS

| | | | |
|---|---|---|---|
| 3,178,200 | 4/1965 | Backaitis et al. | 280/124.152 |
| 3,288,487 | 11/1966 | Bosley, Jr. et al. | 280/124.167 |
| 5,685,527 | 11/1997 | Harbali et al. | 267/277 |

FOREIGN PATENT DOCUMENTS

| | | |
|---|---|---|
| DAS 1 087 011 | 8/1960 | Germany . |
| 43 27 304 A1 | 2/1994 | Germany . |

*Primary Examiner*—Kenneth R. Rice
*Attorney, Agent, or Firm*—Oliff & Berridge, PLC

[57] ABSTRACT

A torsion bar is coupled at a rear end thereof to a floating member which is disposed inside a cross member. A bush is press-fitted into a pipe fixed to the floating member. A collar is attached to an inner periphery of the bush. The collar, which is disposed inside the cross member and axially extends substantially in parallel with the torsion bar, is fixed by a bolt. A force acting on the torsion bar in a fore-to-aft direction with respect to a vehicle body is applied to the bush as an axial shear force. A counterforce generated by torsional deformation of the torsion bar is applied to the bush as a radial compressive force.

13 Claims, 5 Drawing Sheets

TORSION-BAR TYPE SUSPENSION

INCORPORATED BY REFERENCE

The disclosure of Japanese Patent Application No. HEI 9-147637 filed on Jun. 5, 1997 including specification, drawings and abstract is incorporated herein by reference in its entirety.

BACKGROUND OF THE INVENTION

1. Field of Invention

The present invention relates to a suspension for use in vehicles and more particularly relates to a torsion bar-type suspension.

2. Description of Related Art

A torsion bar-type suspension has been conventionally employed as a suspension for use in vehicles. The torsion bar-type suspension includes an arm mechanism and a torsion bar spring (hereinafter referred to simply as a torsion bar). The arm mechanism supports a wheel and is vertically rotatably coupled to a vehicle body. The torsion bar is securely interposed between the arm mechanism and the vehicle body and undergoes torsional deformation in response to vertical rotation of the arm mechanism.

When a force acts on a wheel in a top-to-bottom direction with respect to the vehicle body, the arm mechanism vertically rotates. Since the torsion bar undergoes torsional deformation in response to the rotation of the arm mechanism, the top-to-bottom force acting on the wheel is damped.

When a vehicle goes over a relatively small bump on a road, a force acts on the wheel in a fore-to-aft direction with respect to the vehicle body. This force does not cause the torsion bar to be deformed. Therefore, the fore-to-aft force acting on the wheel is transmitted to the vehicle body without being damped by the torsion bar.

The fore-to-aft force transmitted to the vehicle body makes a driver feel uncomfortable. Thus, making the driver feel comfortable in driving the vehicle requires means for damping the fore-to-aft force transmitted from the torsion bar to the vehicle body.

For example, a torsion bar-type suspension equipped with such means, which is exclusively used for a front wheel of a vehicle, is disclosed in U.S. Pat. No. 3,288,487. In this suspension, the torsion bar is coupled to a cross member serving as a vehicle body frame via a floating member which is disposed behind the cross member and laterally extends in parallel therewith. The torsion bar, which penetrates the cross member to extend toward a rear part of the vehicle, is fixed to the floating member at a rear end thereof. The floating member and the cross member are coupled to each other by an elastic member.

In this construction, a fore-to-aft force acting on the wheel is transmitted from the floating member to the cross member via the elastic member. The elastic member expands and contracts, thus damping the fore-to-aft force. In this manner, the aforementioned conventional suspension provides attenuation of the fore-to-aft force acting on the vehicle body.

In general, an engine and a fuel tank are disposed across the cross member. Thus, easy installation of the engine and the fuel tank requires that a sufficiently ample space be secured across the cross member. However, in the aforementioned conventional suspension, the floating member and the elastic member occupy a space behind the cross member. Thus, the space for installation of the engine and the fuel tank is limited.

In a case where the floating member is disposed outside the cross member, the force transmitted from the floating member to the cross member is indicated by arrows in FIG. 6.

As can be seen from FIG. 6, in the case where the floating member 42 is disposed outside the cross member 36, the force acts on only one of the walls of the cross member 36. Thus, the cross section of the cross member 36 is greatly widened as indicated by a broken line in FIG. 6. In order to prevent such deformation, the cross member 36 must be provided with a reinforcement bottom plate such that the cross section thereof takes a shape of a closed box. However, this countermeasure increases the overall weight of the cross member 36.

In order to ensure that the elastic member effectively damps the fore-to-aft force acting on the wheel, the elastic member is required to exhibit a low rigidity in a direction in which it expands and contracts. On the other hand, when a force acts on the wheel in a top-to-bottom direction with respect to the vehicle body, a counterforce generated by torsional deformation of the torsion bar is applied to the elastic member as a shear force. As described above, the torsion bar-type suspension is constructed such that the top-to-bottom force acting on the wheel is damped by torsional deformation of the torsion bar. That is, the elastic member does not have to attenuate that force. Therefore, an attempt to increase durability requires that the elastic member exhibit a high rigidity in a direction in which it receives a shear force. In the aforementioned conventional suspension, it is preferable that the elastic member exhibit a high rigidity in the direction in which it expands and contracts and exhibit a low rigidity in the direction in which it receives a shear force. As a result, the overall size of the elastic member increases, whereby there is little space left behind the cross member.

SUMMARY OF THE INVENTION

The present invention has been devised in consideration of the aforementioned drawbacks of the conventional suspension. It is an object of the present invention to provide a torsion bar-type suspension capable of attenuating a fore-to-aft force transmitted to a vehicle body without substantially occupying a space across a cross member.

In order to achieve this object, the torsion bar-type suspension according to a first aspect of the present invention includes a torsion bar and an elastic member. The torsion bar undergoes torsional deformation in response to a movement of a wheel in a top-to-bottom direction with respect to a vehicle body. The elastic member is disposed inside a cross member and couples the torsion bar to the cross member.

In the present invention, the torsion bar and the cross member are coupled to each other by the elastic member. Thus, a fore-to-aft force transmitted from the wheel to the torsion bar is damped by the elastic member before being transmitted to the vehicle body. In addition, since the elastic member is disposed inside the cross member, an ample space is secured across the cross member.

Furthermore, in order to achieve the aforementioned object, a torsion bar according to a second aspect of the present invention undergoes torsional deformation in response to top-to-bottom movement of a wheel, and an elastic member is disposed inside a cross member and couples the other end of a coupling member to the cross member.

In the present invention, a force acting on the wheel is transmitted from the torsion bar to the elastic member via the coupling member and damped by the elastic member. Thus, the force to be damped by the elastic member can be reduced by using the coupling member operating, for example, as a moment arm.

In addition to the features of the second aspect, the torsion bar-type suspension according to a third aspect of the present invention is constructed such that an elastic member is a cylindrical member extending substantially parallel to and offset with respect to the torsion bar. In this case, an outer periphery of the elastic member is attached to one of the coupling member and the cross member and an inner periphery thereof is attached to the other of the coupling member and the cross member.

The suspension according to the present invention is constructed such that the elastic member extends substantially parallel and offset with respect to the torsion bar, and that the outer periphery of the elastic member is attached to one of the coupling member and the cross member and the inner periphery thereof is attached to the other of the coupling member and the cross member. Hence, a fore-to-aft force acting on the wheel is applied to the elastic member as an axial shear force. In general, the elastic member exhibits a low rigidity for a shear force applied thereto. Thus, the fore-to-aft force acting on the wheel is effectively damped by the elastic member. Furthermore, since the elastic member is offset with respect to the torsion bar, a counterforce generated by torsional deformation of the torsion bar is applied to the elastic member as a radial compressive force. In general, the elastic member exhibits a high rigidity for a compressive force applied thereto. Thus, it is possible to enhance durability of the elastic member without increasing a size thereof.

In the first through third aspects of the present invention, the elastic member may be coupled to front and rear wall surfaces of the cross member.

In the present invention, the force transmitted to the elastic member is dispersed into components acting on the front and rear walls of the cross member respectively, whereby it is possible to inhibit a cross section of the cross member from being deformed.

Furthermore, in the first through third aspects of the present invention, the cross member may have an open cross section which enables the weight of the cross member to be reduced. Due to the open cross section of the cross member, the elastic member can easily be disposed inside the cross member.

BRIEF DESCRIPTION OF THE DRAWINGS

Further objects, features and advantages of the present invention will become apparent from the following description of preferred embodiments with reference to the accompanying drawings, wherein.

DETAILED DESCRIPTION OF PREFERRED EMBODIMENTS

Figure 1:
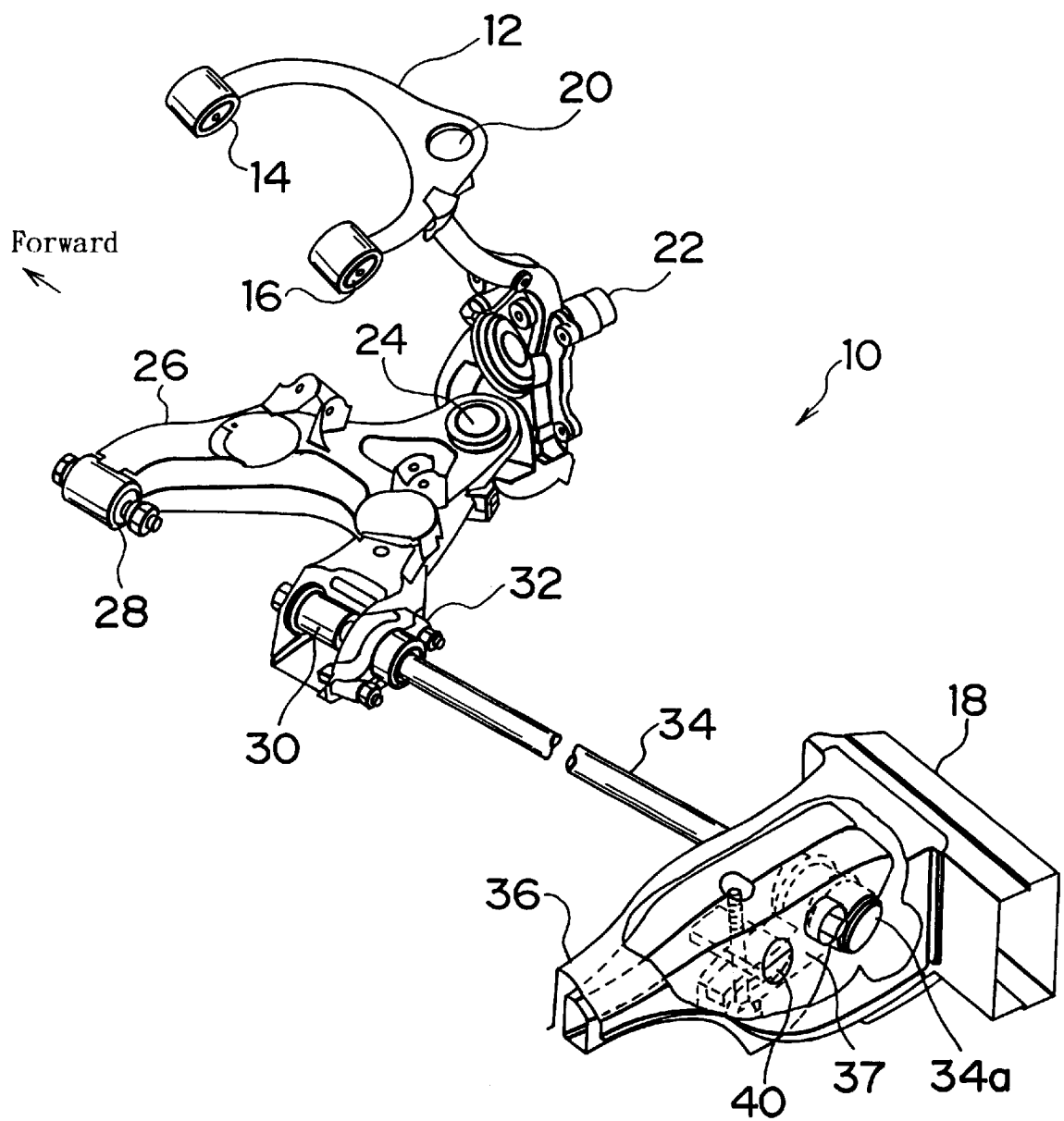
FIG. 1 is a perspective view of a torsion bar-type suspension according to an embodiment of the present invention.

FIG. 1 is a perspective view of a torsion-bar type suspension 10 (hereinafter referred to simply as the suspension 10) according to an embodiment of the present invention. The suspension 10 of this embodiment is designed to be mounted on a front wheel of a vehicle, whose front part corresponds to an upper left portion of FIG. 1. FIG. 1 illustrates only a structural part of the suspension 10 corresponding to a right-front wheel. The following description will be made only as to the structural part of the suspension 10 corresponding to the right-front wheel, which is symmetrical to another structural part of the suspension 10 corresponding to a left-front wheel.

As illustrated in FIG. 1, the suspension 10 includes an upper arm 12 which is coupled to a bracket (not shown) fixed to a chassis frame 18 via bushes 14, 16 such that the upper arm 12 is able to vertically rotate. A knuckle 22 supporting a wheel (not shown) is coupled to the upper arm 12 via a ball joint 20. The knuckle 22 is also coupled to a lower arm 26 via a ball joint 24.

The lower arm 26 is coupled to a bracket (not shown) fixed to the chassis frame 18 via bushes 28, 30 such that the lower arm 26 is able to vertically rotate. A torque arm 32 is fixed to the lower arm 26 at a site surrounding a rotational shaft. The torque arm 32 is coupled to an end (located toward the front part of the vehicle) of a torsion bar spring 34 (hereinafter referred to simply as the torsion bar 34) such that a rotational movement around a center of axis can be transmitted. The torsion bar 34 is disposed substantially coaxially with the rotational shaft on which the lower arm 26 rotates with respect to the chassis frame 18.

Figure 2:
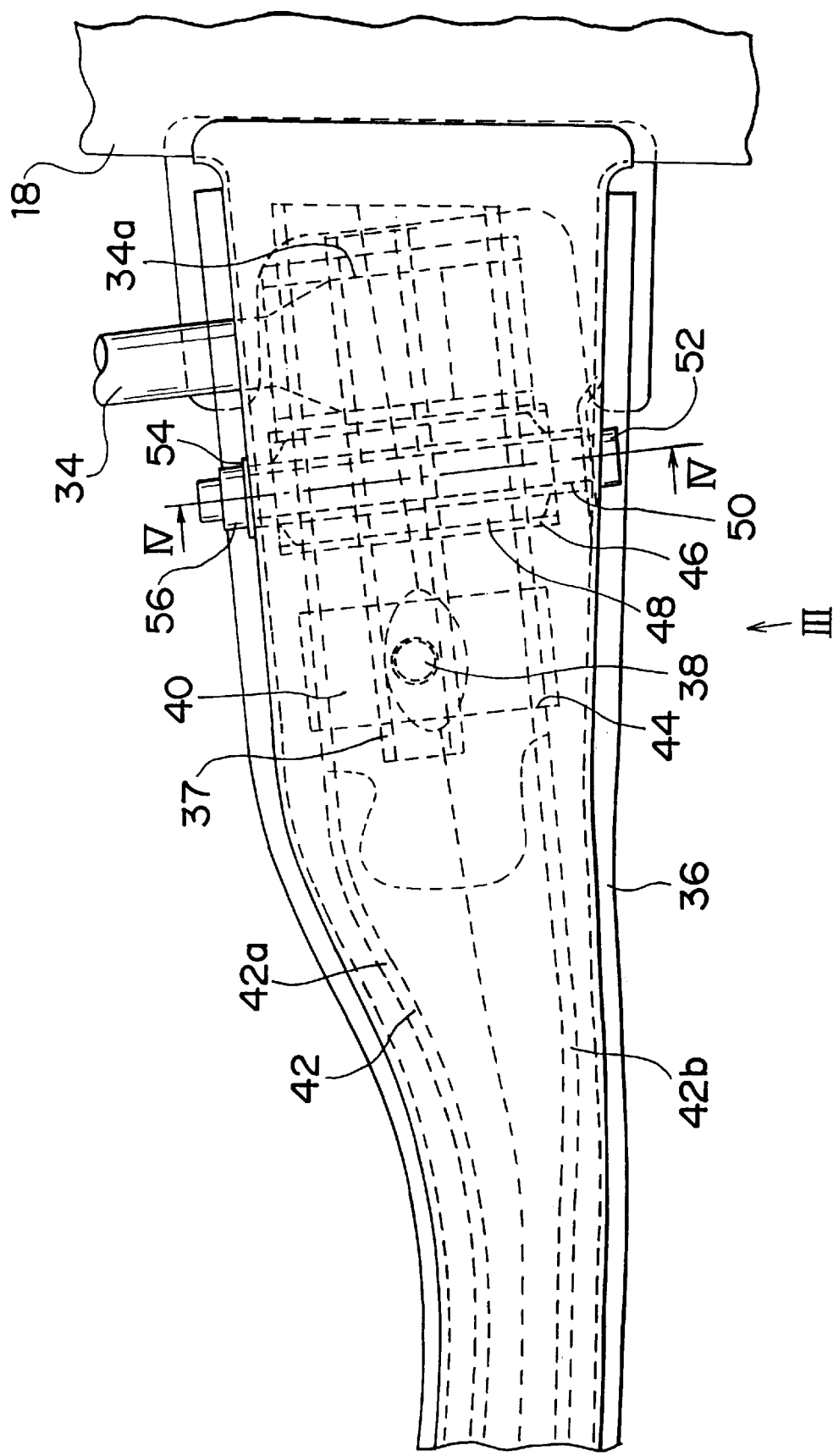
FIG. 2 is an enlarged plan view of a part where a torsion bar of the torsion bar-type suspension of this embodiment is coupled to a cross member.
Figure 3:
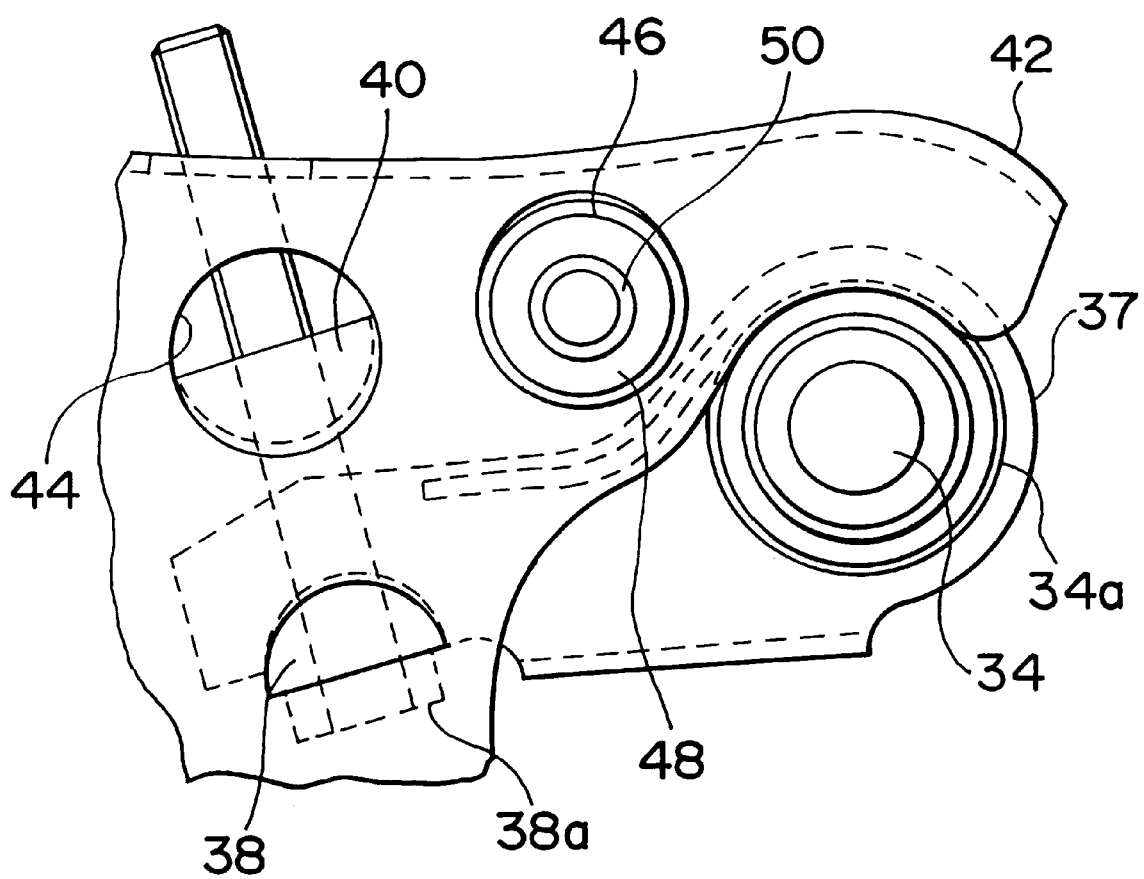
FIG. 3 illustrates a part where the torsion bar is coupled to the cross member, as viewed from an angle indicated by arrow III in FIG. 2, in a state where the cross member has been removed.
Figure 4:
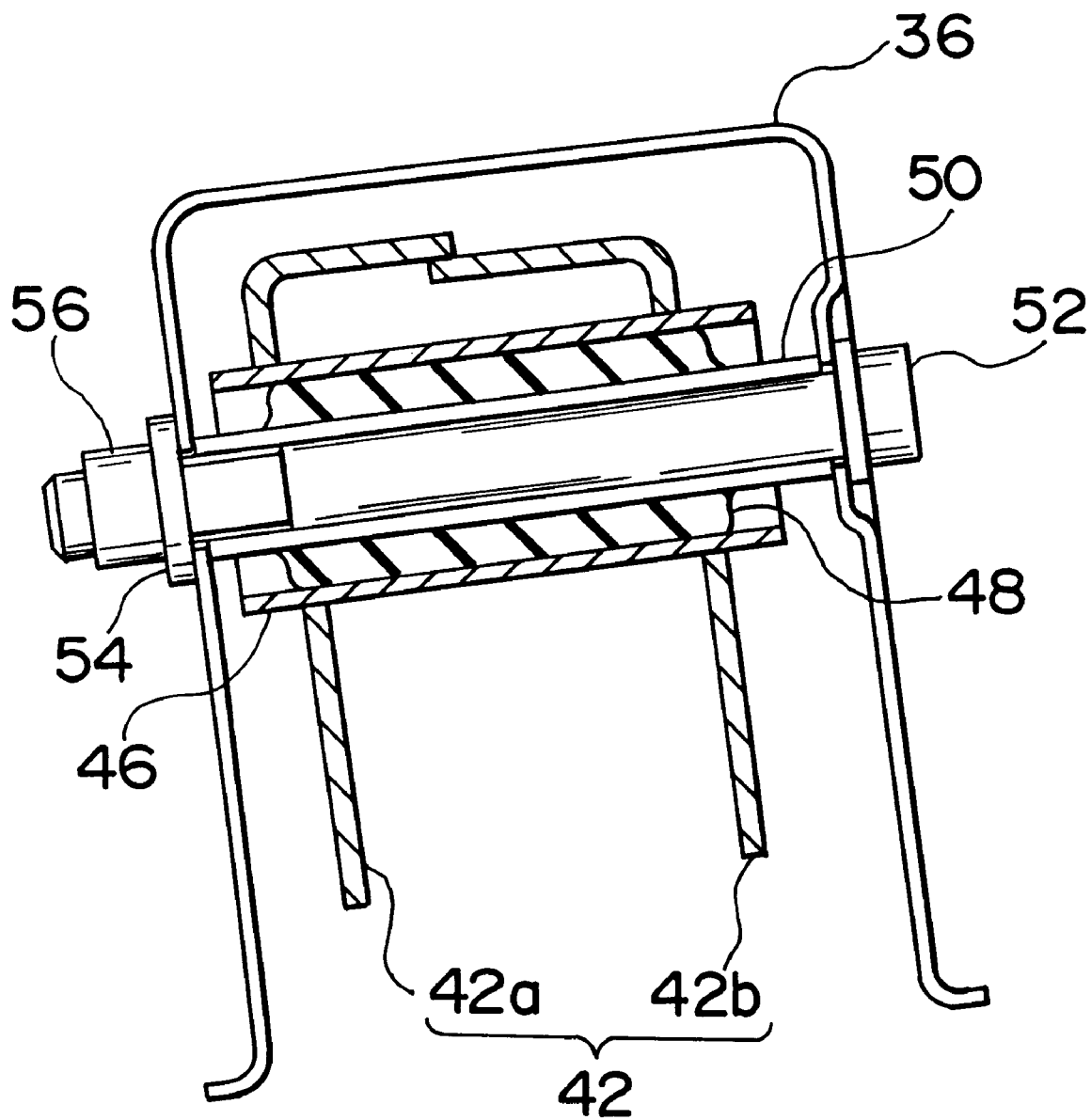
FIG. 4 is a sectional view taken along line IV—IV in FIG. 2.

The other end (located toward the rear part of the vehicle) of the torsion bar 34 is coupled to a cross member 36. As can be seen from FIG. 4, the cross member 36 is a longitudinal member which has a substantially U-shaped cross section with an open bottom. The cross member 36 is welded to the chassis frame 18 at both ends thereof. A part where the torsion bar 34 is coupled to the cross member 36 will be described hereinafter with reference to FIGS. 2 through 4 as well as FIG. 1. FIG. 2 is an enlarged plan view of the part where the torsion bar 34 is coupled to the cross member 36. FIG. 3 illustrates this part as viewed from an angle indicated by arrow III in FIG. 2, in a state where the cross member 36 has been removed. FIG. 4 is a sectional view taken along line IV—IV in FIG. 2.

As illustrated in FIGS. 1 through 3, the torsion bar 34 is provided with a large-diameter portion 34a at the end located toward the rear part of the vehicle. An anchor arm 37 is fitted onto an outer periphery of the large-diameter portion 34a of the torsion bar 34. A part where the anchor arm 37 is fitted onto the large-diameter portion 34a is serrated. Thus, the anchor arm 37 is coupled to the large-diameter portion 34a such that a rotational movement around a center of axis can be transmitted.

A bolt 38 penetrates the anchor arm 37 from a bottom side thereof at a site located toward the inside of the vehicle with respect to the part where the anchor arm 37 is coupled to the torsion bar 34. The bolt 38 is screwed into a swivel 40 which is a semi-cylindrical member fitted into a swivel hole 44 formed in a floating member 42.

In this embodiment, while the torsion bar 34, the anchor arm 37 and the floating member 42 constitute a torsion bar, the anchor arm 37 and the floating member 42 constitute a coupling member.

The floating member 42 is a longitudinal member composed of two members 42a, 42b and laterally extends inside the cross member 36. As illustrated in FIG. 4, the floating member 42 has a substantially U-shaped cross section with an open bottom at both end portions thereof, while as illustrated in FIG. 1, it has a box-like cross section closed on all sides at an intermediate portion thereof.

As can be seen from FIG. 3, an end portion of the floating member 42 is fitted onto and engages the outer periphery of the large-diameter portion 34a of the torsion bar 34. Thus, when the bolt 38 is screwed into the swivel 40, the floating member 42 is pressed onto the large-diameter portion 34a of the torsion bar 34, whereby the floating member 42, the anchor arm 37 and the torsion bar 34 are fixed to each other. In a state where the bolt 38 is screwed into the swivel 40, a head portion 38a thereof is hidden inside the floating member 42.

A pipe 46 extending substantially in parallel with an axis of the torsion bar 34 penetrates the floating member 42 at a site between the swivel hole 44 and the end portion engaging the large-diameter portion 34a of the torsion bar 34. The pipe 46 is, for example, securely welded to the floating member 42. A bush 48, which is a cylindrical member made of an elastic material such as rubber, is press-fitted into the pipe 46. A collar 50 penetrates the bush 48.

The collar 50 is an annular member and, for example, securely adhered to an inner peripheral surface of the bush 48. End surfaces of the collar 50 abut front and rear inner walls of the cross member 36 respectively. A bolt 52 penetrates the cross member 36 and the collar 50. The bolt 52 is screwed into a nut 56 with a washer 54 interposed therebetween, so that the collar 50 is fixed to the cross member 36.

As described above, the torsion bar 34 is fixed to the floating member 42 to which the pipe 46 is fixed, while the collar 50 is fixed to the cross member 36. Therefore, the torsion bar 34 is coupled to the cross member 36 via the bush 48 interposed between the pipe 46 and the collar 50.

In the suspension 10 thus constructed, when a force acting on a wheel in a top-to-bottom direction with respect to a vehicle body fluctuates, the upper arm 12 and the lower arm 26 vertically rotate. The vertical rotation of the lower arm 26 results in torsional deformation of the torsion bar 34. An elastic force generated by torsional deformation of the torsion bar 34 suspends the vehicle body, thus damping fluctuations of the top-to-bottom force acting on the wheel.

A counterforce acting against the elastic force generated by torsional deformation of the torsion bar 34 is transmitted to the floating member 42 via the anchor arm 37 as a force acting in the top-to-bottom direction with respect to the vehicle body. This force is further transmitted to the cross member 36 via the bush 48. In this case, because the elastic member is offset with respect to the torsion bar 34, a radial compressive force acts on the bush 48 in a direction of thickness thereof. Since a force corresponding to vehicle loads always acts on the wheel, a large compressive force always acts on the bush 48 in the direction of thickness thereof. In general, elastic members exhibit a high rigidity for a compressive force. Thus, in this embodiment wherein a top-to-bottom force acting on the wheel is applied to the bush 48 as a radial compressive force, it is possible to ensure durability of the bush 48 without increasing a size thereof.

Since the counterforce acting against the elastic force generated by torsional deformation of the torsion bar 34 is transmitted to the bush 48 with the anchor arm 37 and the floating member 42 operating as a moment arm, the counterforce acting on the bush 48 is relatively small. Hence, it is possible to further enhance durability of the bush 48 without increasing a size thereof.

On the other hand, when the vehicle goes over a relatively small bump on a road, a force acts on the wheel in a fore-to-aft direction with respect to the vehicle body. This force is transmitted to the torsion bar 34 via the lower arm 26 as an axial force. Such an axial force does not cause the torsion bar 34 to be elastically deformed. Therefore, the fore-to-aft force transmitted to the torsion bar 34 is transmitted to the floating member 42 without being damped, and it is further transmitted to the cross member 36 and the chassis frame 18 via the bush 48.

If the fore-to-aft force transmitted from the torsion bar 34 to the floating member 42 is directly transmitted to the chassis frame 18, the vehicle body is subjected to an impact force which would make a driver feel uncomfortable. Making the driver feel comfortable in driving the vehicle requires that the fore-to-aft force transmitted from the floating member 42 to the cross member 36 be damped by the bush 48.

In this embodiment, an outer periphery of the bush 48 is attached to the floating member 42 via the pipe 46 and an inner periphery thereof is attached to the cross member 36 via the collar 50. Thus, when a fore-to-aft force is transmitted from the floating member 42 to the cross member 36 via the bush 48, an axial shear force acts on the bush 48. In general, elastic members exhibit a low rigidity for a shear force. In this embodiment, a fore-to-aft force acting on the wheel is applied to the bush 48 as a shear force, and this force is sufficiently damped by the bush 48. Hence, the fore-to-aft force transmitted to the cross member 36 is effectively attenuated.

As described hitherto, the suspension 10 of this embodiment has a construction wherein the bush 48 has a cylindrical shape, the top-to-bottom force acting on the wheel is transmitted to the bush 48 as a compressive force, and the fore-to-aft force acting on the wheel is transmitted to the bush 48 as a shear force. Therefore, it is possible to ensure durability of the bush 48 without increasing a size thereof, and to effectively attenuate the fore-to-aft force transmitted to the vehicle body.

In general, it is necessary to secure an ample space for an engine and a fuel tank which are disposed across the cross member 36. In the conventional suspension having the floating member 42 disposed behind the cross member 36 with an elastic member interposed therebetween, the elastic member and the floating member 42a occupy a space behind the cross member 36, thus making it impossible to secure an ample space for the engine and the fuel tank. Hence, installation of the engine requires dividing the cross member 36 into two pieces at a center thereof and separating them from each other. In this case, the divided pieces of the cross member 36 must be coupled to each other by a coupling member, which increases the number of structural parts as well as the overall weight of the cross member 36.

In this embodiment wherein the floating member 42 and the bush 48 are disposed inside the cross member 36, those members do not occupy the space across the cross member 36. Thus, this embodiment makes it possible to effectively reduce a fore-to-aft force transmitted to the vehicle without limiting the space for installation of the engine and the fuel tank.

Since the space for installation of the engine is unlimited, there is no need to divide the cross member 36 into two pieces at the center thereof. Thus, this embodiment does not require the coupling member coupling the divided pieces of the cross member 36, thus achieving reduction in the number of structural parts as well as the overall weight of the cross member 36. Furthermore, the aforementioned conventional suspension having the floating member 42 fixed to an outer surface of the cross member 36 via the elastic member requires a large number of bolts for coupling the elastic member to the floating member 42 and the cross member 36 respectively. However, this embodiment wherein the floating member 42 and the bush 48 are disposed inside the cross member 36 requires only one bolt 52 for each of the front wheels in order to allow the floating member 42 to be coupled to the cross member 36 via the bush 48. As described above, in addition to the fact that this embodiment does not require dividing the cross member 36, the number of bolts for coupling the bush 48 to the floating member 42 and the cross member 36 is reduced, whereby the number of structural parts is significantly reduced.

Figure 5:
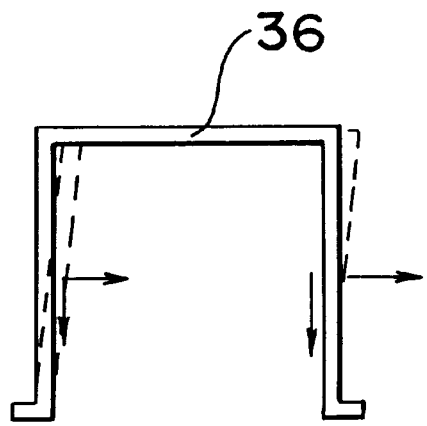
FIG. 5 is a model view illustrating a force transmitted from a floating member to the cross member in this embodiment.
Figure 6:
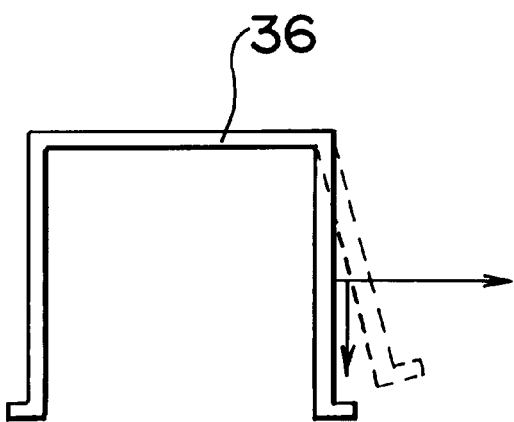
FIG. 6 is a model view illustrating a force transmitted from the floating member to the cross member in a case where the floating member is disposed outside the cross member.

Furthermore, since the floating member 42 is disposed inside the cross member 36, the force transmitted from the floating member 42 to the cross member 36 uniformly acts on the front and rear walls of the cross member 36. FIG. 5 is a model view in which the force transmitted from the floating member 42 to the cross member 36 is indicated by arrows.

As illustrated in FIG. 5, this embodiment ensures that the force transmitted to the floating member 42 is further transmitted to the bush 48 and the collar 50 and dispersed into components acting on the front and rear walls of the cross member 36 respectively. Thus, even if a force is transmitted to the cross member 36 having a cross section with an open bottom, it is possible to inhibit the cross section from being deformed. As a result, the overall weight of the cross member 36 can be reduced. Moreover, since the cross member 36 has a cross section with an open bottom, the floating member 42 can easily be disposed inside the cross member 36.

Furthermore, in this embodiment, the torsion bar 34 and the floating member 42 are coupled to each other by the bolt 38. Accordingly, it is important to prevent the bolt 38 from being damaged in order to ensure structural rigidity of the suspension 10. In this embodiment, the head portion 38a of the bolt 38 is hidden inside the floating member 42, so that the floating member 42 functions as a protection member which prevents the bolt 38 from being damaged. For example, if the bolt 38 has become quite close to a rough road surface, the floating member 42 interferes with the road surface. That is, the bolt 38 does not directly interfere with the road surface.

Although in this embodiment, the bush 48 is a cylindrical member, the present invention is not limited to such a construction. For example, the bush 48 may be a prismatic member. In this case, the inner periphery of the bush 48 may be cylindrical and the outer periphery of the bush 48 may be prismatic. Although in the aforementioned embodiment, the outer periphery of the bush 48 is attached to the floating member 42 via the pipe 46 and the inner periphery thereof is attached to the cross member 36 via the collar 50, the present invention is not limited to such a construction. For example, the inner periphery of the bush 48 may be attached to the torsion bar 34 and the outer periphery thereof may be attached to the cross member 36. In the aforementioned embodiment, the bush 48 corresponds to the aforementioned elastic member.

While the present invention has been described with reference to what are presently considered to be preferred embodiments thereof, it is to be understood that the invention is not limited to the disclosed embodiments or constructions. On the contrary, the invention is intended to cover various modifications and equivalent arrangements.

What is claimed is:

1. A torsion bar-type suspension comprising:
    a torsion bar that is coupled to a cross member of a vehicle body and torsionally deforms in response to movement of a wheel in a top-to-bottom direction; and
    an elastic member disposed inside said cross member for coupling said torsion bar to said cross member, wherein said elastic member is coupled to front and rear wall surfaces of said cross member.

2. The torsion bar-type suspension according to claim 1, wherein said cross member has an open cross section.

3. The torsion bar-type suspension according to claim 1, wherein said torsion bar is formed with said elastic member.

4. A torsion bar-type suspension comprising:
    a torsion bar that is coupled to a cross member of a vehicle body and torsionally deforms in response to movement of a wheel in a top-to-bottom direction;
    a coupling member having a first portion thereof coupled to said torsion bar; and
    an elastic member disposed inside said cross member for coupling a second portion of said coupling member to said cross member, wherein the coupling member and the cross member are coupled only by the elastic member.

5. The torsion bar-type suspension according to claim 4, further comprising an anchor arm for coupling the torsion bar to the first portion of the coupling member.

6. The torsion bar-type suspension according to claim 4, wherein said elastic member is a cylindrical member extending substantially in parallel with said torsion bar and eccentrically with respect thereto, and wherein said elastic member has an outer periphery attached to one of said coupling member and said cross member, an inner periphery attached to the other of said coupling member and said cross member, and an elastic portion attached to said outer periphery and said inner periphery.

7. The torsion bar-type suspension according to claim 6, wherein said elastic member is coupled to front and rear wall surfaces of said cross member.

8. The torsion bar-type suspension according to claim 6, wherein said cross member has an open cross section.

9. The torsion bar-type suspension according to claim 4, wherein said elastic member is coupled to front and rear wall surfaces of said cross member.

10. The torsion bar-type suspension according to claim 4, wherein said cross member has an open cross section.

11. The torsion bar-type suspension according to claim 4, further comprising:
    a suspension arm being moved rotationally, and wherein said torsion bar is attached to a rotational axis of said suspension arm and said coupling member.

12. The torsion bar-type suspension according to claim 4, wherein said coupling member is a longitudinal member laterally extends inside said cross member, and said coupling member is attached to said torsion bars disposed on a left-side and a right-side of a vehicle.

13. The torsion bar-type suspension according to claim 4, wherein said torsion bar penetrates through said cross member.

* * * * *